United States Patent Office 3,471,518
Patented Oct. 7, 1969

3,471,518
FLUOROALKYL DICARBOXYLIC ACIDS
AND DERIVATIVES
Robert B. Hager, King of Prussia, Pa., assignor to Pennsalt Chemicals Corporation, Philadelphia, Pa., a corporation of Pennsylvania
No Drawing. Filed July 10, 1967, Ser. No. 651,967
Int. Cl. C07d 5/00; C07c 149/20
U.S. Cl. 260—345.9
2 Claims

ABSTRACT OF THE DISCLOSURE

Perfluoroalkyl alkylene thiocarboxylic acids and their corresponding anhydrides, acid chlorides and lower alkyl esters are disclosed. The acids are represented by the structures:

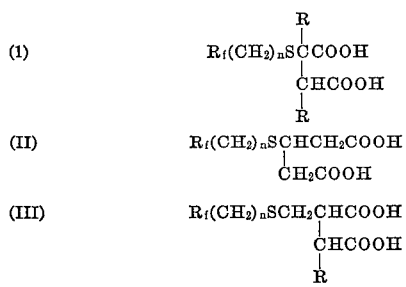

where $R_f$ is perfluoroalkyl, $n=1-3$, and R is H, $CH_3$, or $C_2H_5$, and wherein Formula I at least one R is H. The compounds are used to impart oil and water repellency to leather.

---

The present invention relates to fluoroalkyl thiodicarboxylic acids and their derivatives and more particularly to perfluoroalkyl alkylene thiodicarboxylic acids in which the dicarboxylic moiety comprises a 4 to 5 carbon member linear chain.

The compounds specifically embraced by the present invention are (1) perfluoroalkyl alkylene thiodicarboxylic acids wherein the dicarboxylic moiety is comprised of a 4 or 5 carbon member linear chain, said acids represented by the formulae:

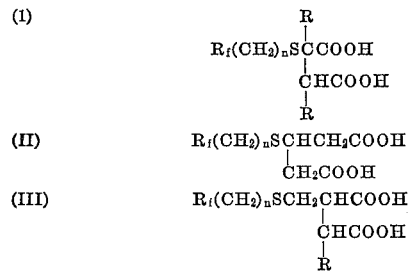

where $R_f$ is a straight or branched chain perfluoroalkyl radical having 5 to 13 carbon atoms, $n$ is an integer of 1 to 3, and R is selected from the group consisting of hydrogen, methyl, and ethyl, with the provision that in Formula I at least one R is hydrogen, (2) the acid anhydrides, (3) the acid chlorides, and (4) the lower alkyl esters of said dicarboxylic acids.

The compounds of the present invention are useful for treating leather to impart thereto a high resistance to oil and water. The compounds are colorless and therefore are especially useful in treating white or light-colored leathers for which treatment with the intensely colored, green, chromium complexes of fluorocarboxylic acids, widely used for leather treatment, is not possible. Hence, in accordance with this invention, oil and water resistant leather that has been treated with a new compound embodied herein is provided.

The dicarboxylic acid of this invention is prepared by reacting a mercaptan of the formula $R_f(CH_2)_nSH$, $R_f$ and $n$ having been defined above, with an alpha-beta ethylenically unsaturated, aliphatic hydrocarbon dicarboxylic acid having 4 to 5 carbon atoms in the dicarboxylic moiety; such unsaturated acids include, for example, maleic, fumaric, citraconic, mesaconic, glutaconic, itaconic, ethyl maleic, methyl itaconic and the like. The perfluoroalkylalkylene-mercaptan reactant may be obtained according to the methods described by N. O. Brace, U.S. 3,172,910, and W. S. Friedlander, U.S. 3,088,849. The preparation of the perfluoroalkyl alkylene thiodicarboxylic acid is conveniently carried out by reacting the fluoroalkyl mercaptan and the unsaturated hydrocarbon dicarboxylic acid in substantially stoichiometric amounts in aqueous ethanol solution in the presence of small amounts of sodium hydroxide and a tertiary amine, such as piperidine, at from about 0° C. to 80° C. The product is recovered by evaporating the ethanol, neutralizing the caustic with aqueous HCl and extracting the product from the aqueous solution with diethyl ether, followed by evaporation of the ether.

The perfluoroalkyl alkylene thiodicarboxylic acid embodied herein is readily converted to the corresponding acid anhydride of the invention, as shown by the following exemplary reaction:

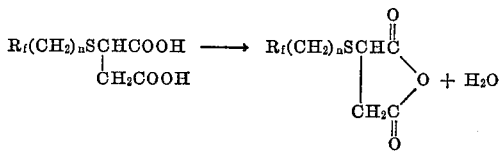

The dehydration of the dicarboxylic acid to its anhydride is accomplished by merely heating the acid to from about 140° C. to about 300° C., preferably under reduced pressure. The characteristic ease of convertibility of the fluoroalkyl thiodicarboxylic acid of this invention to the anhydride is a unique property of those acids which have 4 to 5 member atoms in the linear chain of the dicarboxylic acid moiety thereof. The unique nature of this property is demonstrated by the fact that compounds disclosed by E. T. McBee et al., U.S. 2,908,710, sulfur-containing acids of the formula:

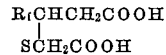

will not form cyclic anhydrides because the dicarboxylic acid moiety is composed of a 6 member linear chain. The anhydrides of the present invention are particularly useful because they are more oil soluble, less corrosive, and chemically much more reactive than the corresponding acids which gives them advantages in leather treatment such as greater choice of application solvents, and more complete reaction with the leather substance, often resulting in even better performance than the acids themselves.

The acid chloride of the present invention is prepared by treating the corresponding acid precursor with an excess of phosphorous pentachloride or thionyl chloride, according to the exemplary reaction:

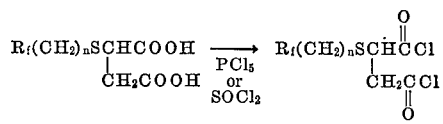

The lower alkyl ester of this invention is provided by either esterifying the fluoroalkyl alkylene thiodicarboxylic acid embodied herein with an alkanol by means well known to the organic chemist, via. the exemplary reaction:

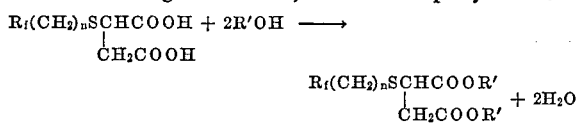

where R' is lower alkyl, e.g. methyl, ethyl, n-propyl, isopropyl, n-butyl, isobutyl, sec-butyl, amyl, etc., or by preparing the lower alkyl ester directly from the starting mercaptan reactant, $R_f(CH_2)_nSH$, by reacting said mercaptan with the dialkyl ester of the alpha-beta ethylenically unsaturated, aliphatic hydrocarbon dicarboxylic acid discussed earlier.

The examples that follow provides illustrative preparations of the compounds of the invention and demonstrate their good properties in leather treatment.

EXAMPLE I

Preparation of $R_f(CH_2)_2SCH(CH_2COOH)COOH$

A flask was charged with 400 g. (0.752 mole) of $(CF_3)_2CF(CF_2)_6CH_2CH_2SH$, 60.2 g. (1.5 mole) of NaOH dissolved in 475 ml. of water, 7.11 g. of piperidine, 87.4 g. (0.752 mole) of maleic acid, and 274 ml. of anhydrous ethanol, and the mixture refluxed for 6 hours.

The ethanol was removed by evaporation and 1.5 liters of water added to the residue. The aqueous solution was washed with three 600 ml. portions of ether and then acidified with hydrochloric acid. Extraction with five 500 ml. portions of ether followed by drying the extract and removing the ether yielded 312 g. (65%) of white product, M.P. 143–5° C., $C_9F_{19}CH_2CH_2SCHCOOH$
$\phantom{C_9F_{19}CH_2CH_2S}|$
$\phantom{C_9F_{19}CH_2CH_2S}CH_2COOH$

*Analysis.*—Calc'd. for $C_{15}F_{19}H_9O_4S$: C, 27.87%; H, 1.40%; F, 55.85%; S, 4.96%; Neut. equiv., 646. Found: C, 28.12%; H, 1.62%; F, 54.61%; S, 5.09%; Neut. equiv., 636.

EXAMPLE II

Preparation of

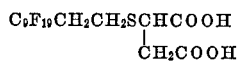

A sample of the acid prepared in Example I was heated to 200° C. in a sublimation apparatus under 0.1 mm. Hg pressure. The anhydride, M.P. 94–97° C., sublimed and was collected. Its infrared spectrum showed a characteristic doublet at 1865/1790 cm.$^{-1}$.

EXAMPLE III

Preparation of

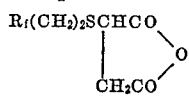

A 250 ml. flask equipped with condenser and magnetic stirrer was charged with 75 g. (0.116 mole) of acid from Example I and 49.5 g. (0.238 mole) of $PCl_5$ and the mixture stirred for 2.5 hours at 35° C. The resulting liquid was filtered and the filtrate diluted with 250 ml. of petroleum ether. On standing overnight at 10° C. a small amount, 7.5 g., of anhydride was deposited. This was removed by filtration. Evaporation of the solvent left 61 g. (76%) of the acid chloride as a light yellow liquid. The infrared spectrum showed the product to be free of anhydride with a single C=O band at 1776 cm.$^{-1}$.

EXAMPLE IV

Preparation of

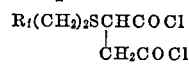

A 250 ml. flask equipped with addition funnel and magnetic stirrer was charged with 50 ml. of ethanol, 0.15 g. of Na, and 53 g. (0.1 mole) of $C_9F_{19}C_2H_4SH$. Diethyl maleate, 17.3 g. (0.1 mole) was added dropwise from the addition funnel while maintaining the reaction temperature below 40° C. The reaction mixture was allowed to stand overnight and then swamped with water. The lower layer was collected, washed with three 25 ml. portions of water and dried over "Drierite." Vacuum fractionation gave 51.5 g. (71%) of the diester, B.P. 137°/ 0.1 mm. Hg, as a colorless liquid. The infrared spectrum showed a single C=O band at 1750 cm.$^{-1}$.

EXAMPLE V

Preparation of a chromium complex of the dicarboxylic acid

A 200 ml. flask equipped with condenser, stirrer, and addition funnel was charged with 16.0 g. (0.06 mole) of $CrCl_3 \cdot 6H_2O$ in 12.5 g. of methanol, and 2.8 g. (0.07 mole) of NaOH in 9.5 g. of methanol was added dropwise. After a 1 hour reflux, 6.46 g. (0.01 mole) of acid from Example I was added and the solution again refluxed for 1 hour. On cooling to room temperature, 5 g. of NaCl was deposited and filtered off leaving 49 g. of green solution of the chromium complex (28.5% solids).

EXAMPLE VI

Treatment of leather with compounds of this invention

Pig suede leather was treated with the compounds of this invention and the results of the extent of oil and water repellency obtained therewith were compared with the results of treatment with a chromium complex of a dicarboxylic acid embodied herein and with a commercially available leather treating agent, the chromium complex of a highly fluorinated organic acid.

The dicarboxylic acid and the anhydride of the invention were applied to the pig suede leather from an aqueous emulsion of 1 to 5% acid or anhydride, 10% tetrahydrofural alcohol, and 40% water based on drained weight of leather (65% moisture) using a model tanning wheel and drumming for 45 minutes at 120° F. The skins were pasted and dried 5 hours at 150° F. and then staked and dry milled. The chromium complex-treated skins were done in the same wheel using a medium float at 100° F., and a 45 minute drumming. These skins were horsed for 6 hours and then pasted and treated as above.

The following table lists the compounds tested:

| Sample | Compound | Percent load of compound on leather |
|---|---|---|
| (1) | None | |
| (2) | Chromium complex of highly fluorinated organic acid ("Leather Chemical FC-146"), 30% solids. | 5 |
| (3) | $R_f(CH_2)_2SCH(CH_2COOH)COOH$ | 5 |
| (4) | $R_f(CH_2)_2SCH(CH_2COOH)COOH$ | 3 |
| (5) | $R_f(CH_2)_2SCH(CH_2COOH)COOH$ | 2 |
| (6) | $R_f(CH_2)_2SCH(CH_2COOH)COOH$ | 1 |
| (7) | Chromium complex of $R_f(CH_2)_2SCH(CH_2COOH)COOH$ from Example V (28.5% solids). | 4 |

The evaluations of the treated leathers were made using test methods described in a bulletin published by the Minnesota Mining and Manufacturing Company, May 1, 1960, "3M Brand Leather Chemical FC-146," except for the water repellency spray rating which was determined according to AATCC Standard Test Method 22–1952. In all, the following tests were made: water repellency by measuring "percent absorbed water" (low value is desirable) and "spray rating" (high value is desirable); oil repellency by measuring "percent absorbed oil" (low value is desirable) and surface oil rating (high value is desirable); chemical resistance by "caustic burn" test and "acid curl" test. The data is tabulated in the following table:

| Sample No. | Percent absorbed H₂O | Spray rating | Percent absorbed oil | Surface oil rating | NaOH burn | Acid curl (deg.) |
|---|---|---|---|---|---|---|
| (1) | 90-100 | 0 | 80-100 | 0 | Severe | 90 |
| (2) | 66 | 50 | 58 | 50 | Stain | 0 |
| (3) | 54 | 70 | 11 | 80 | None | 0 |
| (4) | 57 | 80 | 49 | 50 | ...do... | 0 |
| (5) | 56 | 80 | 56 | 50 | ...do... | 0 |
| (6) | 65 | 80 | 57 | 50 | ...do... | 0 |
| (7) | 84 | 70 | 68 | 50 | ...do... | 0 |

The above results demonstrate the marked superiority of the colorless compounds of this invention as leather treating agents compared to the green-colored chromium complex materials.

EXAMPLE VII

The acid anhydride described in Example II was used to treat leather at a 2% load in the above described manner with the following results:

Percent absorbed H₂O _____ 45
Spray rating _____ 80
Percent absorbed oil _____ 46
Surface oil rating _____ 70
NaOH burn _____ None
Acid curl _____ 0

The anhydride treated leather gave a Maeser Dynamic Water Absorption Test (ASTM 2099–62 T) value of 8681 compared to 1689 for the equivalent loading of the corresponding diacid.

I claim:
1. A compound selected from the group consisting of (a) perfluoroalkyl alkylene thiodicarboxylic acids, wherein the dicarboxylic moiety is comprised of a 4 or 5 carbon member linear chain, said acids represented by the structures

(I) 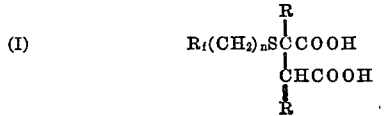

(II) $R_f(CH_2)_nSCHCH_2COOH$
    $\quad\quad\quad\quad\quad\quad |$
    $\quad\quad\quad\quad\quad\quad CH_2COOH$ (III) $R_f(CH_2)_nSCH_2CHCOOH$
    $\quad\quad\quad\quad\quad\quad\quad |$
    $\quad\quad\quad\quad\quad\quad\quad CHCOOH$
    $\quad\quad\quad\quad\quad\quad\quad |$
    $\quad\quad\quad\quad\quad\quad\quad R$ where $R_f$ is a straight or branched chain perfluoroalkyl radical having 5 to 13 carbon atoms, $n$ is an integer of 1 to 3, and R is selected from the group consisting of hydrogen, methyl and ethyl, with the provision that in structure I at least one R is hydrogen, and (b) the acid anhydrides of said dicarboxylic acids.

2. A compound according to claim 1 wherein the diboxylic moiety is:

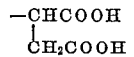

References Cited
UNITED STATES PATENTS 3,172,910   3/1965   Brace _____ 260—539

ALEX MAZEL, Primary Examiner
B. I. DENTZ, Assistant Examiner

U.S. Cl. X.R.

8—94.13; 69—21; 252—8.57; 260—346.8, 537